(12) United States Patent
Kurashima

(10) Patent No.: US 8,705,717 B2
(45) Date of Patent: Apr. 22, 2014

(54) TELEPHONE RELAYING APPARATUS, TELEPHONE RELAYING METHOD, AND PROGRAM

(75) Inventor: Akihisa Kurashima, Tokyo (JP)

(73) Assignee: NEC Corporation, Tokyo (JP)

( * ) Notice: Subject to any disclaimer, the term of this patent is extended or adjusted under 35 U.S.C. 154(b) by 136 days.

(21) Appl. No.: 13/257,926

(22) PCT Filed: Apr. 30, 2010

(86) PCT No.: PCT/JP2010/003087
§ 371 (c)(1), (2), (4) Date: Sep. 20, 2011

(87) PCT Pub. No.: WO2010/134271
PCT Pub. Date: Nov. 25, 2010

(65) Prior Publication Data
US 2012/0063584 A1   Mar. 15, 2012

(30) Foreign Application Priority Data
May 19, 2009   (JP) ................................. 2009-121374

(51) Int. Cl.
*H04M 3/42* (2006.01)
*H04M 3/54* (2006.01)

(52) U.S. Cl.
USPC ............ 379/201.01; 379/211.02; 379/355.04; 379/355.09; 455/414.1

(58) Field of Classification Search
USPC ............. 379/201.01, 201.02, 355.04, 355.09, 379/355.1, 211.01–212.01; 455/414.1, 417
See application file for complete search history.

(56) References Cited

U.S. PATENT DOCUMENTS

2007/0121915 A1* 5/2007 Fujita ........................ 379/355.07
2012/0051531 A1* 3/2012 Park et al. ................ 379/201.02

FOREIGN PATENT DOCUMENTS

| JP | 2005130387 A | 5/2005 |
| JP | 2007013615 A | 1/2007 |
| JP | 2007150711 A | 6/2007 |
| JP | 2008301539 A | 12/2008 |
| WO | 2006003758 A | 1/2006 |

OTHER PUBLICATIONS

International Search Report for PCT/JP2010/003087 mailed Jul. 27, 2010.

* cited by examiner

*Primary Examiner* — Harry S Hong
(74) *Attorney, Agent, or Firm* — Sughrue Mion, PLLC

(57) ABSTRACT

A telephone relaying apparatus 200 receives a request for connection to a second telephone terminal 300 from a first telephone terminal 100. The connection request includes telephone numbers of the first telephone terminal 100 and the second telephone terminal 300. The telephone relaying apparatus 200 stores a real number that is a telephone number used in the case of directly connecting to each telephone terminal and a published number that is a number published for a third party as a telephone number of the telephone terminal in correlation with each other. When receiving the connection request, the telephone relaying apparatus 200 makes a first call with respect to the first telephone terminal 100, and a second call with respect to the second telephone terminal 300. In a case where the telephone number, which is included in the connection request, of the second telephone terminal 300 is the published number, the telephone relaying apparatus 200 reads out the real number of the second telephone terminal 300, and then makes a second call with respect to the second telephone terminal 300.

5 Claims, 12 Drawing Sheets

| PUBLISHED NUMBER (EXTENSION NUMBER) | REAL NUMBER |
|---|---|
| 3001 | 8439001 |
| 3002 | 8241233 |
| 3003 | 8234332 |
| ⋮ | ⋮ |

(b)

210

| DISTRICT NUMBER | CALLING NUMBER |
|---|---|
| 821 | 2092 |
| 8 | 2091 |
| — | 2090 |
| ⋮ | ⋮ |

| DISTRICT NUMBER THAT IS OMITTED |
|---|
| 843 |

210

(b)

| PUBLISHED NUMBER | REAL NUMBER (CALLED NUMBER) | REAL NUMBER (CALLING NUMBER) |
|---|---|---|
| 3001 | 8439001 | 9001 |
| 3002 | 8241233 | 8241233 |
| 3003 | 8234332 | 8234332 |
| ⋮ | ⋮ | ⋮ |

| PUBLISHED NUMBER | REAL NUMBER (EXTERNAL LINE) | REAL NUMBER (EXTENSION LINE) |
|---|---|---|
| 3011 | 050−××××−×××1 | 8439001 |
| 3012 | 050−××××−×××2 | 8241233 |
| 3013 | 050−××××−×××3 | 8234332 |
| ⋮ | ⋮ | ⋮ |

TELEPHONE RELAYING APPARATUS, TELEPHONE RELAYING METHOD, AND PROGRAM

TECHNICAL FIELD

The present invention relates to a telephone relaying apparatus, a telephone relaying method, and a program that relay a call between a call origination terminal and a call destination terminal by making a call to each of the call origination terminal and the call destination terminal complying with a call request.

BACKGROUND ART

In recent years, a calling party has made a call request through a computer terminal or the like. In this case, the computer terminal or the like transmits information specifying a telephone number of a call origination telephone terminal (that is a telephone terminal that is used by a calling party), and information specifying a telephone number of a call destination telephone terminal to a telephone relaying apparatus. Then, a telephone relaying apparatus makes a call to the call origination telephone terminal, and makes a call to the call destination telephone terminal. The call origination telephone terminal and the call destination telephone terminal perform a call process through the telephone relaying apparatus.

For example, a method of controlling a third party call is disclosed in a Request For Comment (RFC) 3725. According to this method, when a mobile terminal makes an instruction on a call destination to the telephone relaying apparatus through a data communication network, the telephone relaying apparatus makes a call to the call destination and the mobile terminal that made an instruction.

In addition, the fact that identification information of the telephone device that becomes the call origination and the telephone number of the call destination are stored in the telephone relaying apparatus in advance is disclosed in Patent Document 1. When receiving a telephone call from the telephone device, the telephone relaying apparatus establishes this telephone connection, reads out a telephone number corresponding to the identification information of the telephone terminal, makes a telephone call using this telephone number, and thereby performs the telephone relaying process.

RELATED DOCUMENT

Patent Document

[Patent Document 1] International Laid-Open Publication No. 2006/003758

DISCLOSURE OF THE INVENTION

In regard to a call on an extension telephone, it is important to recognize that a call origination telephone terminal or a call destination telephone terminal belongs to which business location through an extension number. On the other hand, in a case where an existing mobile communication network is connected to an existing extension communication network, and a mobile telephone is used as an extension telephone, as described above, the mobile communication network is treated as an independent extension communication network. Therefore, in a case where a call is made from the mobile telephone to the extension telephone, an extension number displayed on the destination telephone terminal becomes a number that indicates a call from the mobile telephone. Therefore, even when a user of the mobile terminal is a person belonging to the same business location as that of a user of the destination telephone terminal, the user of the destination telephone terminal may not recognize that the calling party is a person belonging to the same business location from the calling number displayed on the telephone terminal.

As described above, even when receiving a call from a telephone terminal belonging to a different business location, it may be necessary to show as if this call is made by a telephone terminal belonging to the same business location.

As a method of solving such a problem, the present inventor conceived that a real number that is a telephone number used in the case of directly connecting to the telephone terminal and a published number that is a number published for a third party as a telephone number of the telephone terminal are stored in correlation with each other in the telephone relaying apparatus, and the published number is transformed into the real number in the telephone relaying apparatus. In this manner, a user of the telephone terminal is conscious of the published number of the telephone number, and need not to be conscious of the real number. However, when such a function is added to the above-described telephone relaying apparatus, there is a possibility that the number of calls that is exchanged between the telephone relaying apparatus and the switching equipment will increase.

An object of the invention is to provide a telephone relaying apparatus, a telephone relaying method, and a program that manages a real number and a published number, and decrease the number of time of calls between a telephone relaying apparatus and a switching equipment.

According to the invention, there is provided a telephone relaying apparatus that is used in a communication network provided with switching equipment. The telephone relaying apparatus includes a telephone number storage unit that, for each of a plurality of telephone terminals that is connected to the communication network, stores a real number that is a telephone number used in the case of directly connecting to the telephone terminal and a published number that is a number published for a third party as a telephone number of the telephone terminal in correlation with each other; a connection request receiving unit that receives a request for connection to a second telephone terminal from a first telephone terminal, the connection request including a telephone number of the first telephone terminal connected to the communication network and the published number of the second terminal; a first connection processing unit that makes a first call to the first telephone terminal; and a second connection processing unit that reads out the real number of the second telephone terminal from the telephone number storage unit based on the published number, which is included in the connection request, of the second telephone terminal, and makes a second call to the second telephone terminal, in which the real number of the second telephone terminal is set as a called number.

According to the invention, there is provided a telephone relaying method, in which a telephone relaying apparatus is provided to a communication network provided with switching equipment, and the telephone relaying apparatus is provided with a telephone number storage unit that, for each of a plurality of telephone terminals that is connected to the communication network, stores a real number that is a telephone number used in the case of directly connecting to the telephone terminal and a published number that is a number published for a third party as a telephone number of the telephone terminal in correlation with each other. The method includes allowing the telephone relaying apparatus to receive a request for connection to a second telephone terminal from a first telephone terminal, the connection request including a telephone number of the first telephone terminal connected to the communication network and the published number of the second terminal; to make a call to the first telephone terminal; and to read out the real number of the second telephone terminal from the telephone number storage unit based on the published number, which is included in the connection request, of the second telephone terminal, and make a second call to the second telephone terminal, in which the real number of the second telephone terminal is set as a called number.

According to the invention, there is provided a program that allows a computer to serve as a telephone relaying apparatus, in which the telephone relaying apparatus is provided to a communication network provided with switching equipment. The program allows the computer to execute a function of connecting to a telephone number storage unit that, for each of a plurality of telephone terminals that is connected to the communication network, stores a real number that is a telephone number used in the case of directly connecting to the telephone terminal and a published number that is a number published for a third party as a telephone number of the telephone terminal in correlation with each other; a function of receiving a request for connection to a second telephone terminal from a first telephone terminal, the connection request including a telephone number of the first telephone terminal connected to the communication network and the published number of the second terminal; a function of making a first call to the first telephone terminal; and a function of reading out the real number of the second telephone terminal from the telephone number storage unit based on the published number, which is included in the connection request, of the second telephone terminal, and making a second call to the second telephone terminal, in which the real number of the second telephone terminal is set as a called number.

According to the invention, in regard to a telephone relaying apparatus that manages a real number and a published number, it is possible to decrease the number of calls that are exchanged between the telephone relaying apparatus and switching equipment.

BRIEF DESCRIPTION OF THE DRAWINGS

The above and other objects, advantages and features of the present invention will be more apparent from the following description of certain preferred embodiments taken in conjunction with the accompanying drawings.

FIGS. 3(a) and 3(b) are diagrams that illustrate data stored in a telephone number storage unit in a table format.

FIG. 7 is a diagram illustrating a data configuration of the telephone number storage unit of a telephone relaying apparatus according to a third embodiment in a table format.

FIG. 11 is a diagram illustrating a data configuration of a telephone number storage unit in a table format.

DESCRIPTION OF EMBODIMENTS

Figure 1:
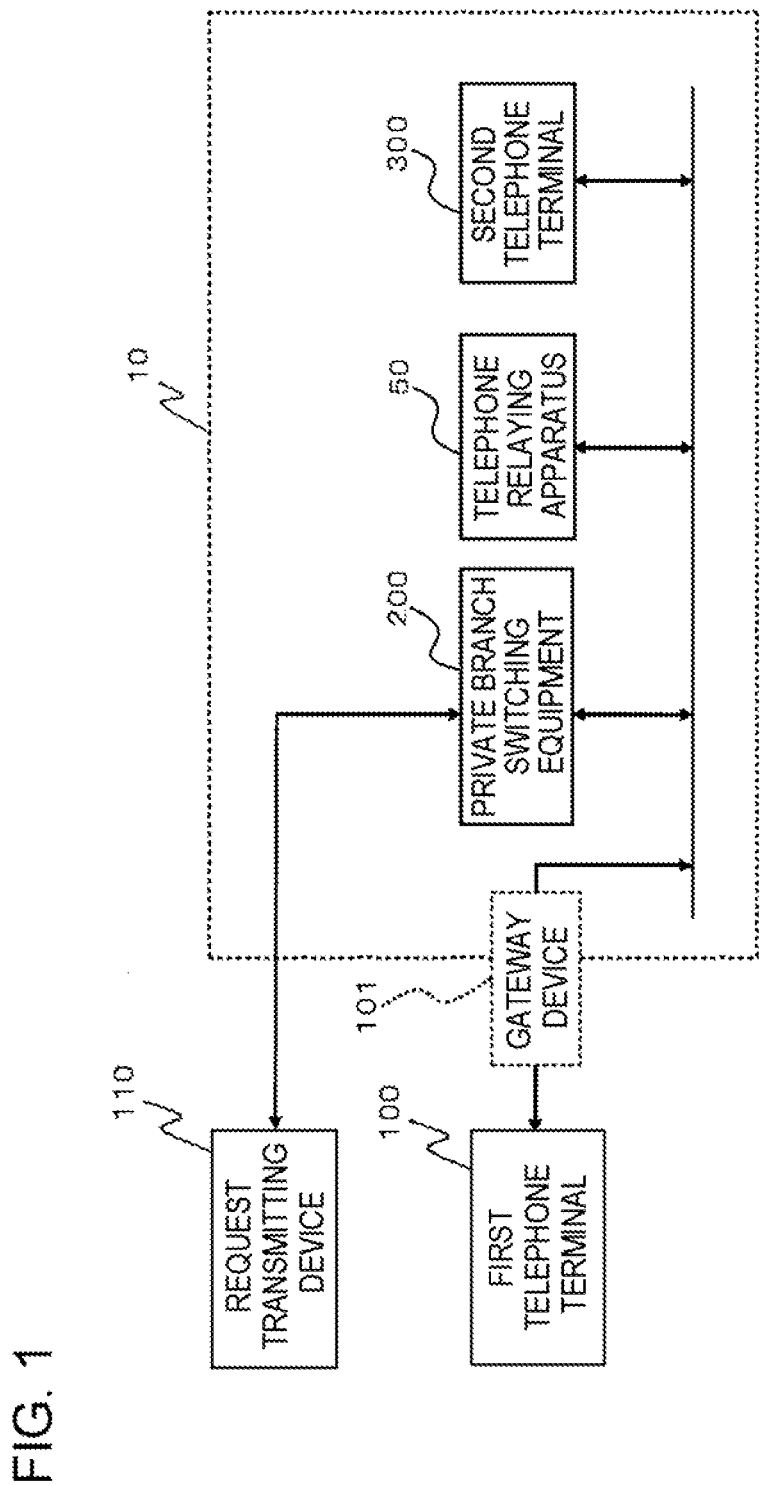
FIG. 1 is a diagram illustrating a usage environment of a telephone relaying apparatus related to a first embodiment.

Hereinafter, embodiment of the invention will be described with reference to the accompanying drawings. In addition, in all drawings, like reference numerals will be given to like parts having the same functions, and description thereof will not be repeated.

FIG. 1 shows a diagram illustrating a usage environment of a telephone relaying apparatus 200 according to a first embodiment. This telephone relaying apparatus 200 is an apparatus that performs a relaying process between a first telephone terminal 100 and a second telephone terminal 300. The telephone relaying apparatus 200 is used within a communication network 10 having a private branch switching equipment 50. The telephone relaying apparatus 200 stores a telephone number of each of a plurality of telephone terminals connected to a communication network 10.

The telephone terminal may be located within the communication network 10, or may be connected to the communication network 10 through a gateway device 101. In an example illustrated in this drawing, the first telephone terminal 100 is connected to the communication network 10 through the gateway device 101, and the second telephone terminal 300 is located within the communication network 10. However, the second telephone terminal 300 may be also connected to the communication network through the gateway device 101, and the first telephone terminal 100 and the second telephone terminal 300 may be located within the communication network 10. Each telephone terminal may be an IP telephone, or a common telephone.

The telephone relaying apparatus 200 stores a real number that is a telephone number used in the case of directly connecting to the telephone terminal and a published number that is a number published for a third party as a telephone number of the telephone terminal in correlation with each other. In addition, the telephone relaying apparatus 200 receives a request for connection to the second telephone terminal from the first telephone terminal 100. In this embodiment, the connection request is transmitted from a request transmitting device 110 (for example, a computer terminal) through a data communication network different from a telephone communication network. The request transmitting device 110 is operated by a user of the first telephone terminal 100. In addition, it is not necessary for the telephone communication network and the data communication network to be physically different communication network, and these may be logically different communication network.

The connection request includes a telephone number of the first telephone terminal, and a telephone number of the second telephone terminal, respectively. The telephone number of the second telephone terminal included in the connection request may be the published number. When receiving the connection request, the telephone relaying apparatus 200 makes a first call to the first telephone terminal 100 and a second call to the second telephone terminal 300. In a case where the telephone number of the second telephone terminal 300, which is included in the connection request, is the published number, the telephone relaying apparatus 200 reads out the real number of the second telephone terminal 300 based on this published number. The real number of the second telephone terminal 300 is set as a called number in regard to the second call.

Figure 2:
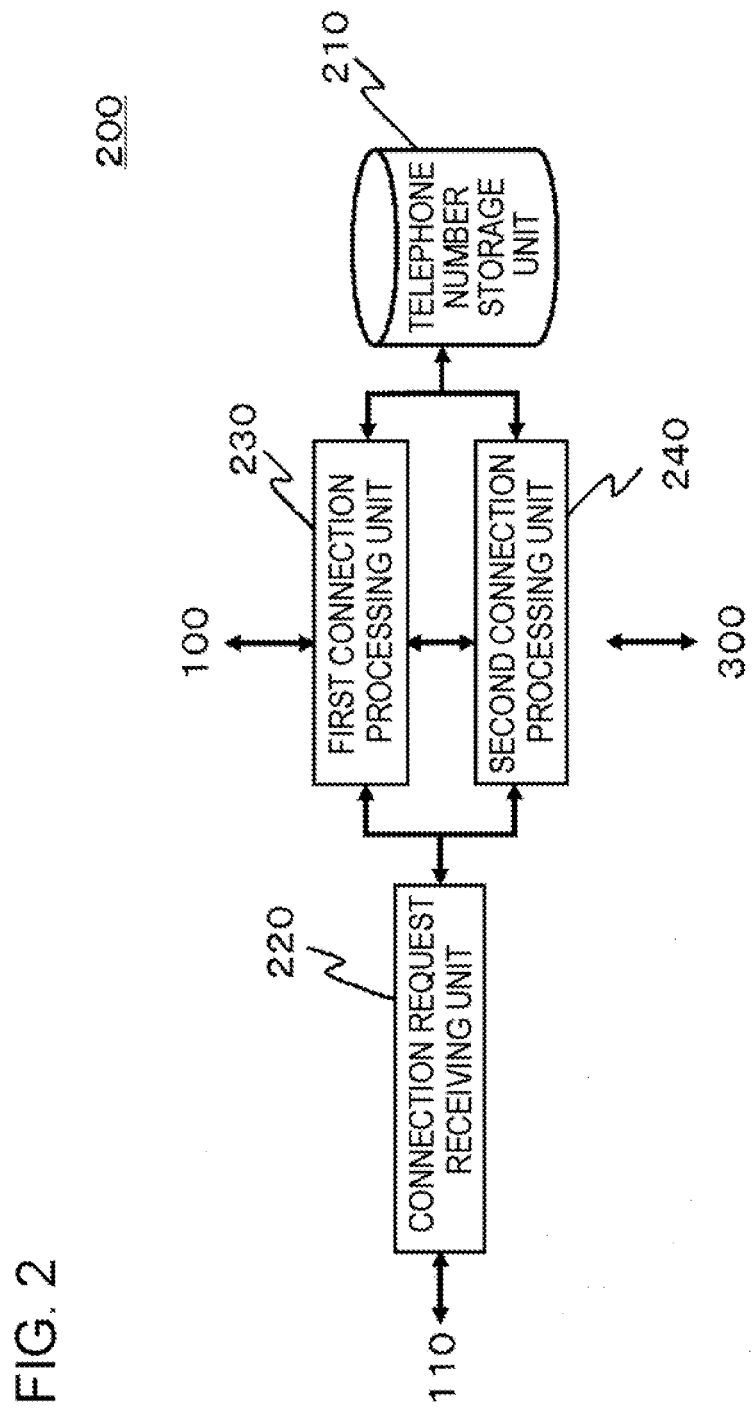
FIG. 2 is a block diagram illustrating a functional configuration of the telephone relaying apparatus.

FIG. 2 shows a block diagram illustrating a functional configuration of the telephone relaying apparatus 200. The telephone relaying apparatus 200 includes a telephone number storage unit 210, a connection request receiving unit 220, a first connection processing unit 230, and a second connection processing unit 240. The telephone number storage unit 210 stores a telephone number for each of a plurality of telephone terminals. The connection request receiving unit 220 receives a request for connection to the second telephone terminal 300 from the first telephone terminal 100 through, for example, the request transmitting device 110. The first connection processing unit 230 makes a first call to the first telephone terminal 100. The second connection processing unit 240 makes a second call mentioned above to the second telephone terminal 300. The first connection processing unit 230 and the second connection processing unit 240 perform a transmission and a reception of voice information, and thereby a call between the first telephone terminal 100 and the second telephone terminal 300 is established.

In addition, the telephone number storage unit 210 stores the real number and the published number in correlation with each other for each telephone terminal. The real number is a telephone number used at the time of directly connecting to the telephone terminal, and the published is a telephone number published for a third party as a telephone number of the telephone terminal.

In a case where the telephone number of the first telephone terminal 100 in regard to the connection request is the real number, the second connection processing unit 240 reads out the published number corresponding to the real number of the first telephone terminal 100 from the telephone number storage unit 210, and makes a second call using this published number as a calling number. In addition, the first connection processing unit 230 makes a first call by using the real number included in the connection request as a called number.

In addition, in a case where the telephone number of the first telephone terminal 100 in regard to the connection request is the published number, the first connection processing unit 230 reads out the real number corresponding to the published number of the first telephone terminal 100 from the telephone number storage unit 210, and makes a first call by using the real number as a called number. In addition, the second connection processing unit 240 makes a second call by using the published number included in the connection request as a calling number.

In addition, in a case where the telephone number of the second telephone terminal 300 in regard to the connection request is the real number, the second connection processing unit 240 makes a second call by using the real number included in the connection request as a called number. In addition, the first connection processing unit 230 reads out the published number corresponding to the real number of the second telephone terminal 300 from the telephone number storage unit 210. In addition, the first connection processing unit 230 informs this published number in regard to the first call, and displays the published number of the second telephone terminal 300 on the first telephone terminal 100 as a called number in regard to the call from the first telephone terminal 100 to the second telephone terminal 300.

In addition, in a case where the telephone number of the second telephone terminal 300, which is included in the connection request, is the published number, the first connection processing unit informs this published number in regard to the first call, and displays the published number of the second telephone terminal 300 on the first telephone terminal 100 as a called number in regard to the call from the first telephone terminal 100 to the second telephone terminal 300. In addition, the second connection processing unit 240 reads out the real number corresponding to the published number of the second telephone terminal 300 and makes a second call by using this real number as a called number.

In addition, in FIG. 2, a configuration of a part not related to the invention in essence is omitted. Each component of the telephone relaying apparatus 200 shown in FIG. 2 is not a hardware unit configuration but a functional unit block. Each component of the telephone relaying apparatus 200 is realized by an arbitrary combination of hardware and software that mainly includes a CPU and a memory of an arbitrary computer, a program that is loaded to a memory and realizes components shown in this drawing, a storage unit such as a hard disk storing the program, and an interface for a network connection. In addition, it should be understood by those skilled in the art that various modifications may be made in regard to the realizing method and device.

FIGS. 3(*a*) and 3(*b*) show diagrams illustrating data stored in a telephone number storage unit 210 in a table format. The telephone number storage unit 210 stores both data shown in FIGS. 3(*a*) and 3(*b*). As described above, the telephone number storage unit 210 stores the published number and the real number in correlation with each other. In the example shown in FIG. 3, it is indicated that each published number is in the 3000s, and a telephone terminal is present in the same communication network 10. In addition, the real number includes a district number and a calling number that are arranged in this order. The district number is a numerical string indicating to which district a user of the telephone terminal belongs.

FIG. 3(*b*) shows a diagram illustrating information correlated with a calling number which the telephone number storage unit 210 stores in a table format. In this example, an upper partial numerical string of a calling number in a first call and a calling number in a second call that corresponds to this numerical string are divided and are stored.

Figure 4:
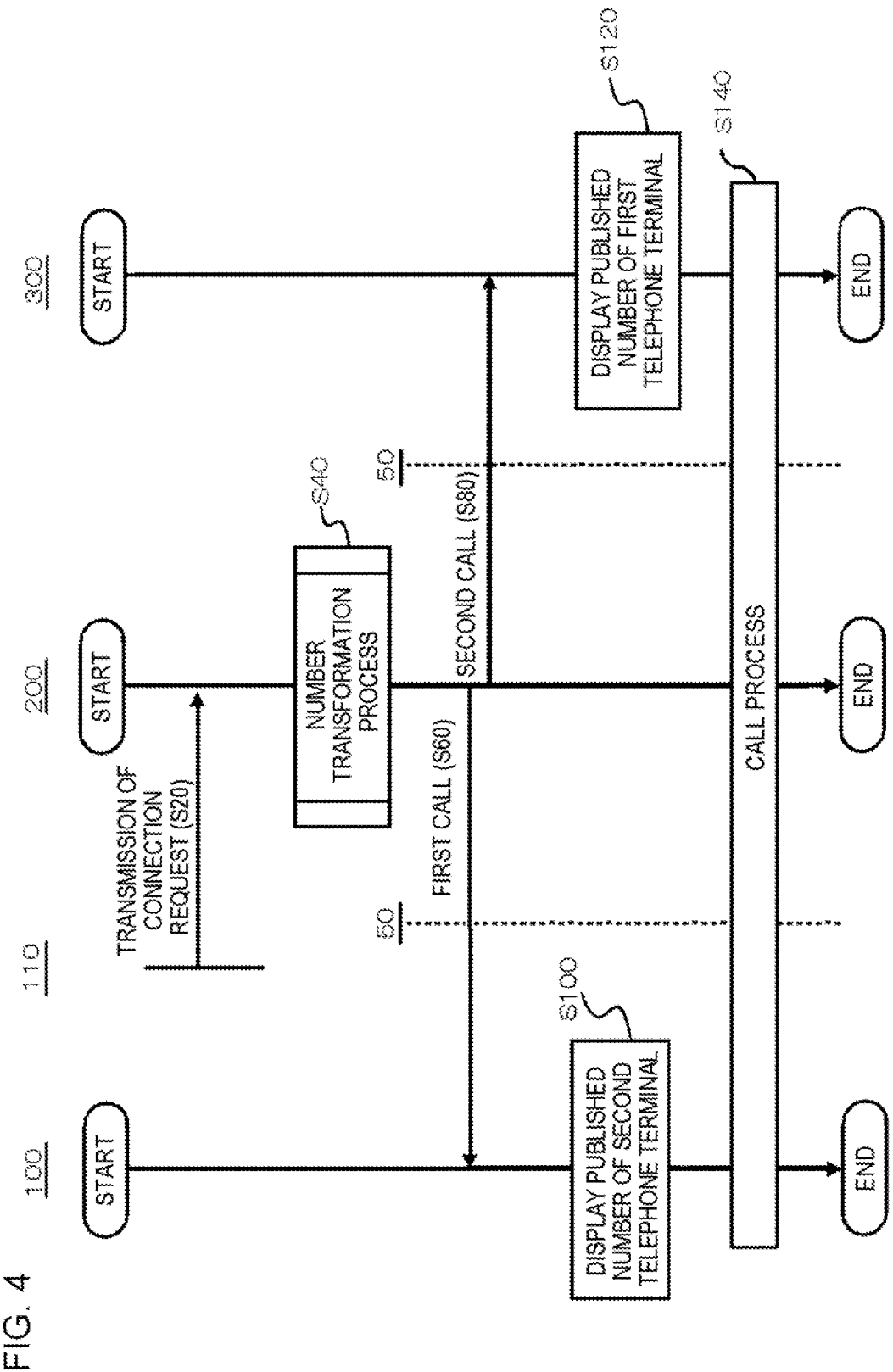
FIG. 4 is a flow chart illustrating an operation of the telephone relaying apparatus in an environment shown in FIG. 1.

FIG. 4 shows a flow chart illustrating an operation of the telephone relaying apparatus 200 in the environment shown in FIG. 1. First, the request transmitting device 110 transmits a connection request that indicates that a call is made from the first telephone terminal 100 to the second telephone terminal 300 with respect to the telephone relaying apparatus 200 (step S20). This connection request includes a telephone number of the first telephone terminal 100 and a telephone number of the second telephone terminal 300.

The connection request receiving unit 220 of the telephone relaying apparatus 200 receives a connection request. The first connection processing unit 230 and the second connection processing unit 240 of the telephone relaying apparatus 200 performs a transformation process between the published number and the real number. The details of this process will be described later (step S40).

The first connection processing unit 230 makes a first call with respect to the first telephone terminal 100 through the private branch switching equipment 50 (step S60), and the second connection processing unit 240 makes a second call to the second telephone terminal 300 through the private branch switching equipment 50 (step S80). The published number of the second telephone terminal 300 is included in the first call, and the published number of the first telephone terminal 100 is included in the second call. The first telephone terminal 100 displays the published number of the second telephone terminal 300, which is included in the first call, as a telephone number of a destination telephone terminal (step S100). In addition, the second telephone terminal 300 displays the published number, which is included in the second call, of the first telephone terminal 100 as a telephone number of a call origination telephone terminal (step S120).

When a user makes an input indicating the response to the first call, the first telephone terminal 100 performs a telephone connection to the first connection processing unit 230 of the telephone relaying apparatus 200. When the first call is connected, the telephone relaying apparatus 200 makes a second call to the second telephone terminal 300. When a user of the second telephone terminal 300 makes an input indicating the response to the second call, the second telephone terminal 300 performs a telephone connection with the second connection processing unit 240 of the telephone relaying apparatus 200. When both of the first call and the second call are connected, the first connection processing unit 230 and the second connection processing unit 240 of the telephone relaying apparatus 200 perform the transmission and reception of voice data to and from each other. In this manner, the first telephone terminal 100 and the second telephone terminal 300 may perform a call (step S140).

Figure 5:
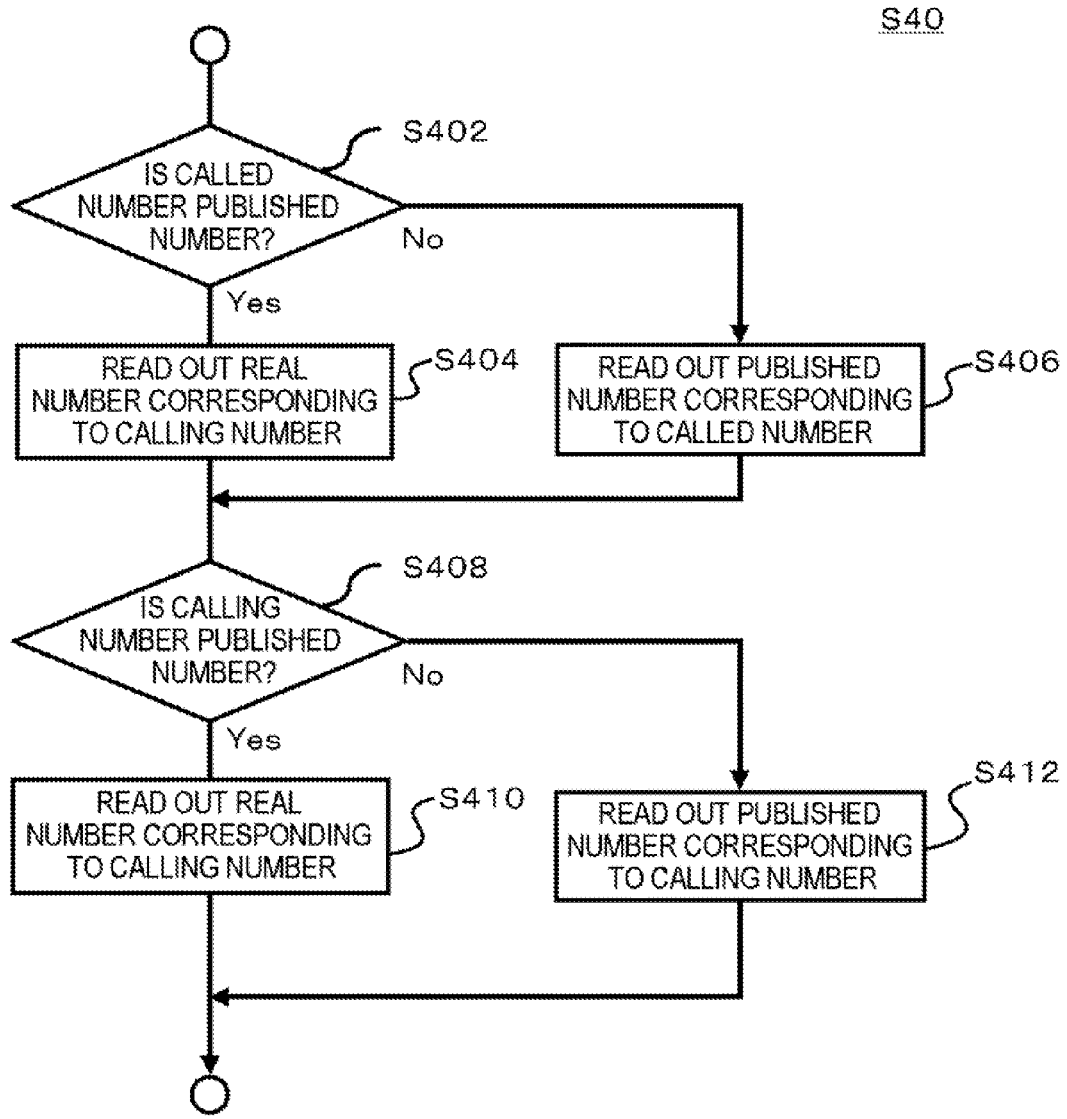
FIG. 5 is a flowchart illustrating the details of step S40 of FIG. 4.

FIG. 5 shows a flow chart illustrating the details of step S40 of FIG. 4. First, in a case where a called number included in the connection request, that is, a telephone number of the second telephone terminal 300 is the published number (Yes in step S402), the second connection processing unit 240 reads out the real number corresponding to this published number from the telephone number storage unit 210 and sets it as a called number of a second call (step S404). In addition, in a case where the telephone number of the second telephone terminal 300 is the real number (No in step S402), the first connection processing unit 230 reads out the published number corresponding to this real number from the telephone number storage unit 210 and allows it to be included in the first call (step S406).

In addition, in a case where a calling number included in the connection request, that is, a telephone number of the first telephone terminal 100 is the published number (Yes in step S408), the first connection processing unit 230 reads out the real number corresponding to this published number from the telephone number storage unit 210 and sets it as a called number of the first call (step S410). In a case where the telephone of the first telephone terminal 100 is the real number (No in step S408), the second connection processing unit 240 reads out the published number corresponding to this real number from the telephone number storage unit 210 and set it as a calling number of the second call (step S412).

Figure 12:
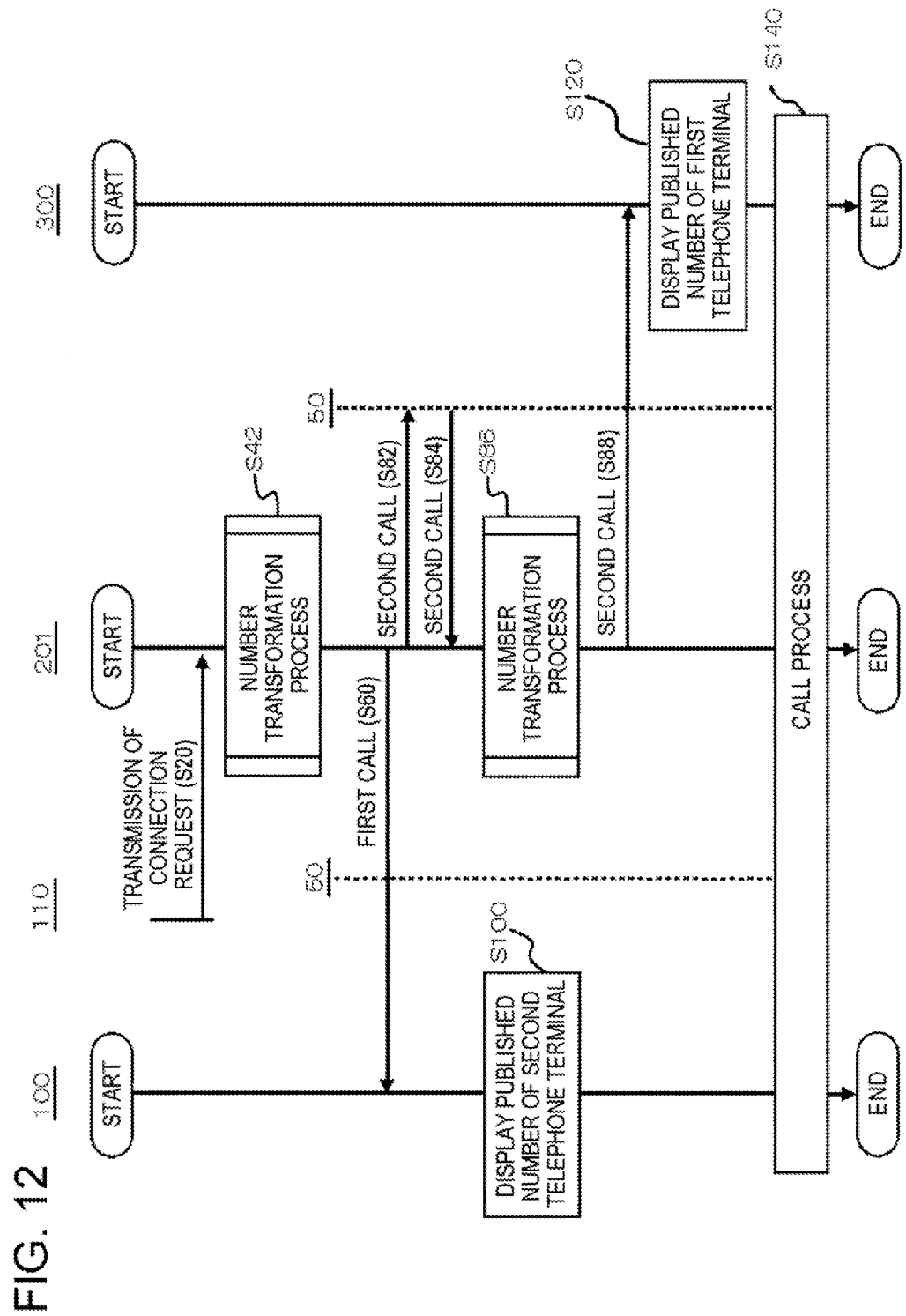
FIG. 12 is a flow chart illustrating an operation of a telephone relaying apparatus as a comparative example.

Here, an advantage of the process shown in FIG. 4 will be described with reference to FIG. 12. FIG. 12 illustrates an operation when the telephone number storage unit 210 and a transformation function of the telephone number are provided to a common telephone relaying apparatus 201. The common telephone relaying apparatus 201 uses the telephone number of the second telephone terminal 300 included in the connection request as a calling number of the second call as it is. In this manner, in FIG. 12, when the connection request is received by the telephone relaying apparatus 201, first, a transformation process of a telephone number of the first telephone terminal 100 is performed (step S42). In addition, a second call is performed with respect to the private branch switching equipment 50 (step S82), but a called number in the second call is the telephone number of the second telephone terminal 300, such that the second call is returned in the private branch switching equipment 50 to the telephone relaying apparatus 201 (step S84). The telephone relaying apparatus 201 transforms the published number, which is included in the second call, of the second telephone terminal 300 to the real number, and makes the second call again through the private branch switching equipment 50 (step S88).

In this manner, in regard to the second call, as shown in steps S82 and S84, a reciprocation of a call occurs between the private branch switching equipment 50 and the telephone relaying apparatus 201.

Next, an operation and an effect of this embodiment will be described. According to this embodiment, commonly, all of the first telephone terminal 100 and the second telephone terminal 300 are connected to the private branch switching equipment 50 through the telephone relaying apparatus 200, and therefore are connected to a destination telephone terminal. When a connection request indicates a call from the first telephone terminal 100 to the second telephone terminal 300, and the telephone number, which is included in the connection request, of the second telephone terminal 300 is the published number, the telephone relaying apparatus 200 transforms this published number of the second telephone terminal 300 to the real number, and then makes a second call. A called number of the second call is the real number of the second telephone terminal 300. Therefore, in regard to the second call, the reciprocation of the call between the private branch switching equipment 50 and the telephone relaying apparatus 200 does not occur differently from the example shown in FIG. 12.

In addition, the telephone number storage unit 210 stores the published number and the real number for each telephone terminal. Even in a case where the telephone number of the first telephone terminal 100 and the telephone number of the second telephone terminal 300, which are included in a call request, are either the real number or the published number, the first connection processing unit 230 displays the published number of the second telephone terminal 300 on the first telephone terminal 100, and the second connection processing unit 240 displays the published number of the first telephone terminal 100 on the second telephone terminal 300. Therefore, a user of the first telephone terminal 100 may easily confirm to whom he makes a call. In addition, a user of the second telephone terminal 300 may easily confirm from whom a call is made.

Furthermore, in a case where all of the published number of the first telephone terminal 100 and the published number of the second telephone terminal 300 are numbers used in the communication network 10, even when the first telephone terminal 100 belongs to a communication network different from that of the second telephone terminal 300, it is possible to show, with respect to the user of the second telephone terminal 300, as if the user of the first telephone terminal 100 belongs to the same business location.

Figure 6:
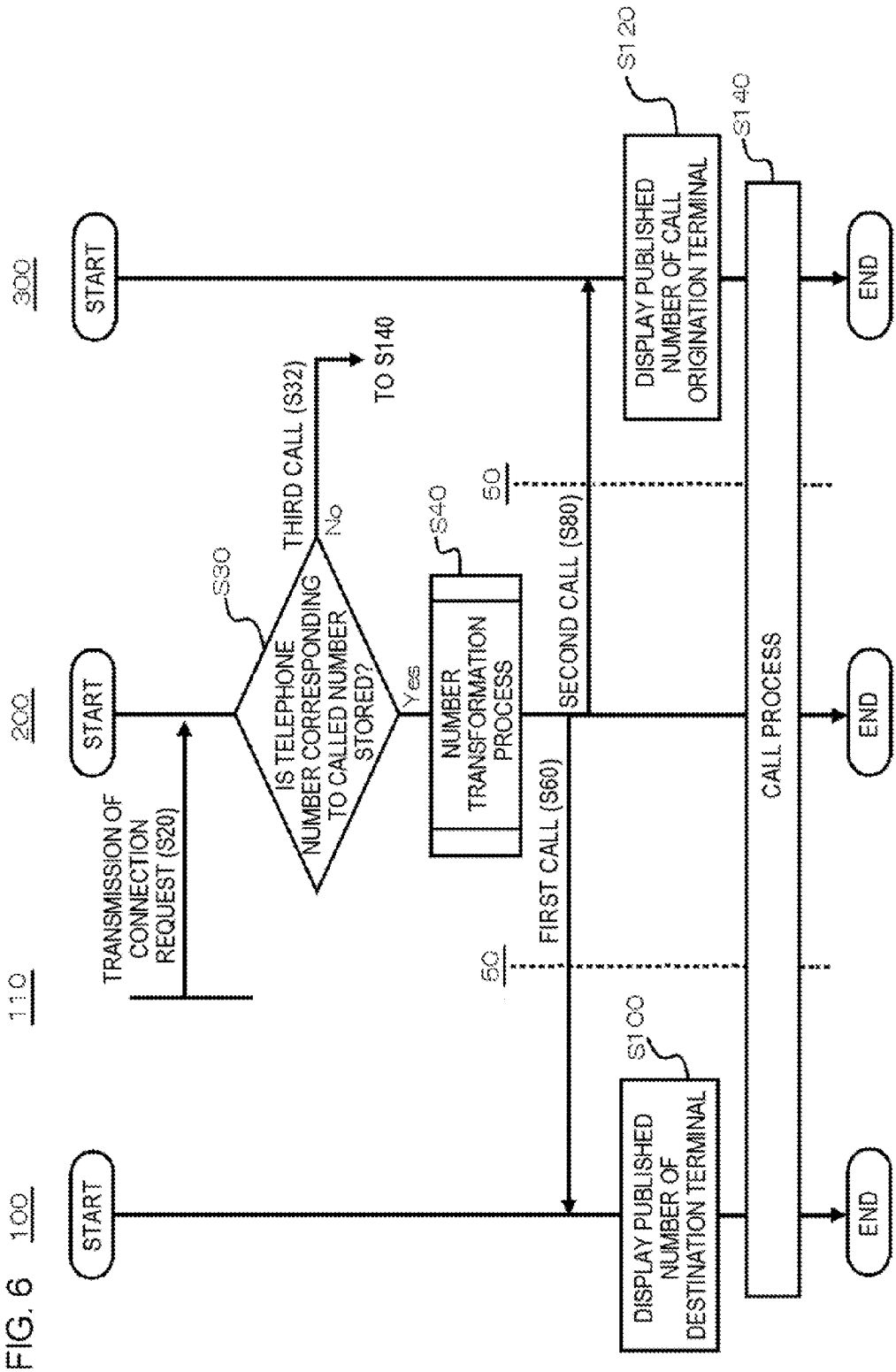
FIG. 6 is a flow chart illustrating a process of a telephone relaying apparatus according to a second embodiment.

FIG. 6 shows a flow chart illustrating a process of a telephone relaying apparatus 200 according to a second embodiment. A functional configuration of the telephone relaying apparatus 200 is the same as that of the first embodiment, such that the description thereof will not be repeated.

The process illustrated in this embodiment is the same as the process shown in FIG. 4 in regard to the first embodiment except that step S30 is included.

In a case where the telephone number that is included in a connection request received in step S20 as a called number is not included in the telephone number storage unit 210 as any one of the published number and the real number (No in step S30), the second connection processing unit 240 of the telephone relaying apparatus 200 makes a third call in which the telephone number of the first telephone terminal 100 is set as a calling number and the telephone number of the second telephone terminal 300 is set as a called number to the private branch switching equipment 50 (step S32).

In addition, in a case where the telephone number that is included in the connection request received in step S20 as a called number is included in the telephone number storage unit 210 as either the published number or the real number (Yes in step S30), the telephone relaying apparatus 200 performs the processes step S40 and subsequent thereto.

In the embodiment, it is also possible to obtain the same effect as that of the first embodiment. In addition, even when the first telephone terminal 100 makes a call to an external telephone terminal, it is possible to perform a call with this telephone terminal.

FIG. 7 shows a diagram illustrating a data configuration of the telephone number storage unit 210 of a telephone relaying apparatus 200 according to a third embodiment in a table format. In an example shown in this drawing, as shown in FIG. 7(b), the telephone number storage unit 210 stores the real number that is to be used as a calling number in regard to a first call, and the real number that is to be used as a called number in regard to a second call, respectively. Specifically, in a part of the real number that is to be used as the calling number in regard to the first call, a district number is omitted. As shown in FIG. 7(a), the telephone number storage unit 210 stores the district number that may be omitted.

In addition, another functional configuration and usage environment of the telephone relaying apparatus 200 is the same as that of the second embodiment. In addition, the relaying process using the telephone relaying apparatus 200 according to this embodiment is the same as that of the second embodiment except for the details of step S30 in FIG. 6.

Figure 8:
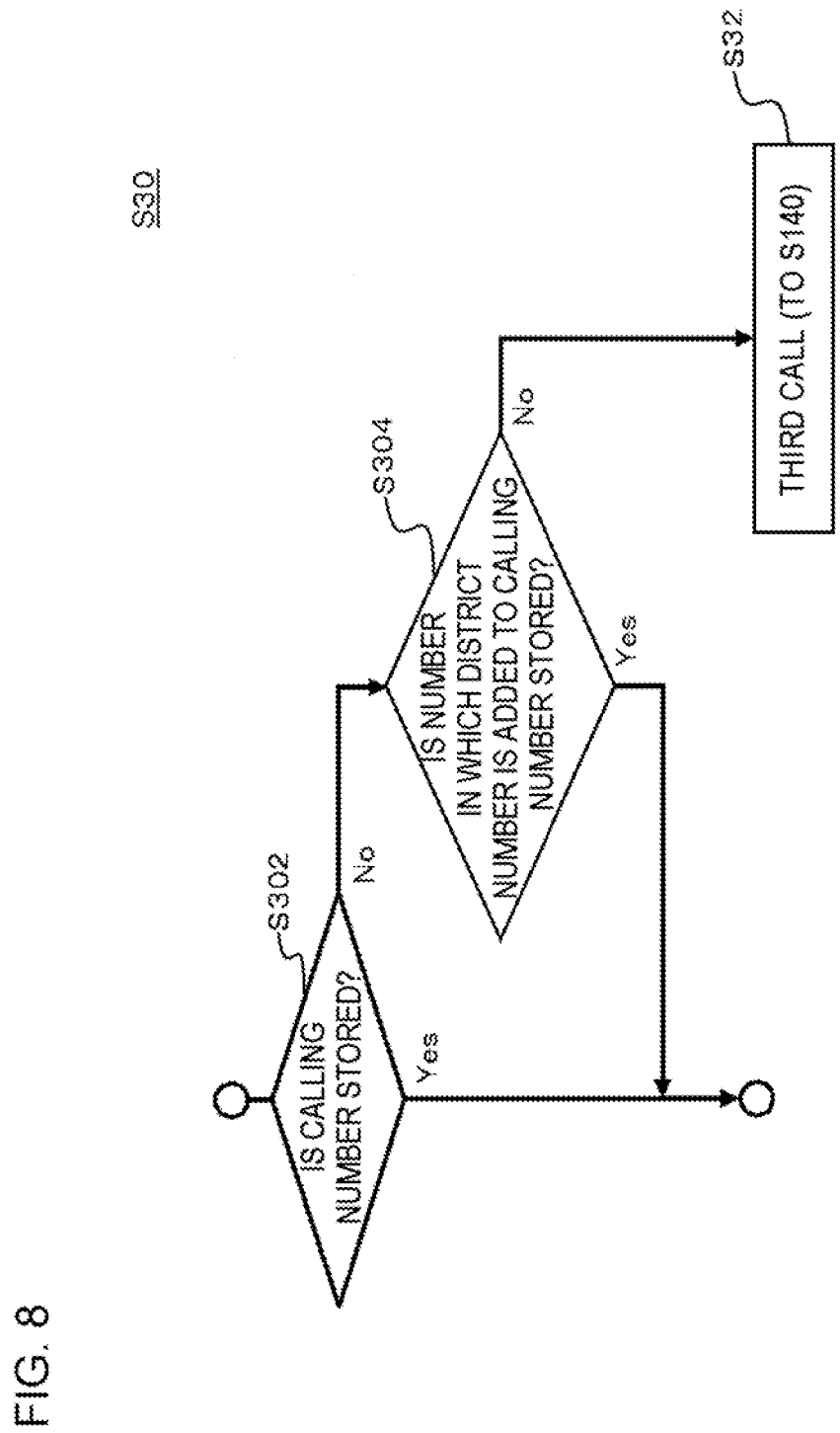
FIG. 8 is a flowchart illustrating the details of step S30.

FIG. 8 shows a flow chart illustrating the details of step S30 in this embodiment. First, in a case where a calling number of a first call is stored in the telephone number storage unit 210 (Yes in step S302), the telephone relaying apparatus 200 performs the processes step S40 and subsequent thereto in FIG. 6.

In addition, in a case where the calling number of the first call is not stored in the telephone number storage unit 210 (No in step S302), the first connection processing unit 230 or the second connection processing unit 240 reads out a number that is stored in the telephone number storage unit 210 as a district number that can be omitted. The first connection processing unit 230 or the second connection processing unit 240 adds the read-out number to the front of the calling number of the first call. In a case where the number after the addition is stored in the telephone number storage unit 210 (Yes in step S304), the telephone relaying apparatus 200 performs the processes subsequent S40 and subsequent thereto in FIG. 6. In addition, in a case where the number after the addition is also not stored in the telephone number storage unit 210 (No in step S304), a third call in which the telephone number of the first telephone terminal 100 is set as a calling number and the telephone number of the second telephone terminal 300 is set as a called number to the private branch switching equipment (step S32).

In the embodiment, it is also possible to obtain the same effect as that of the second embodiment.

Figure 9:
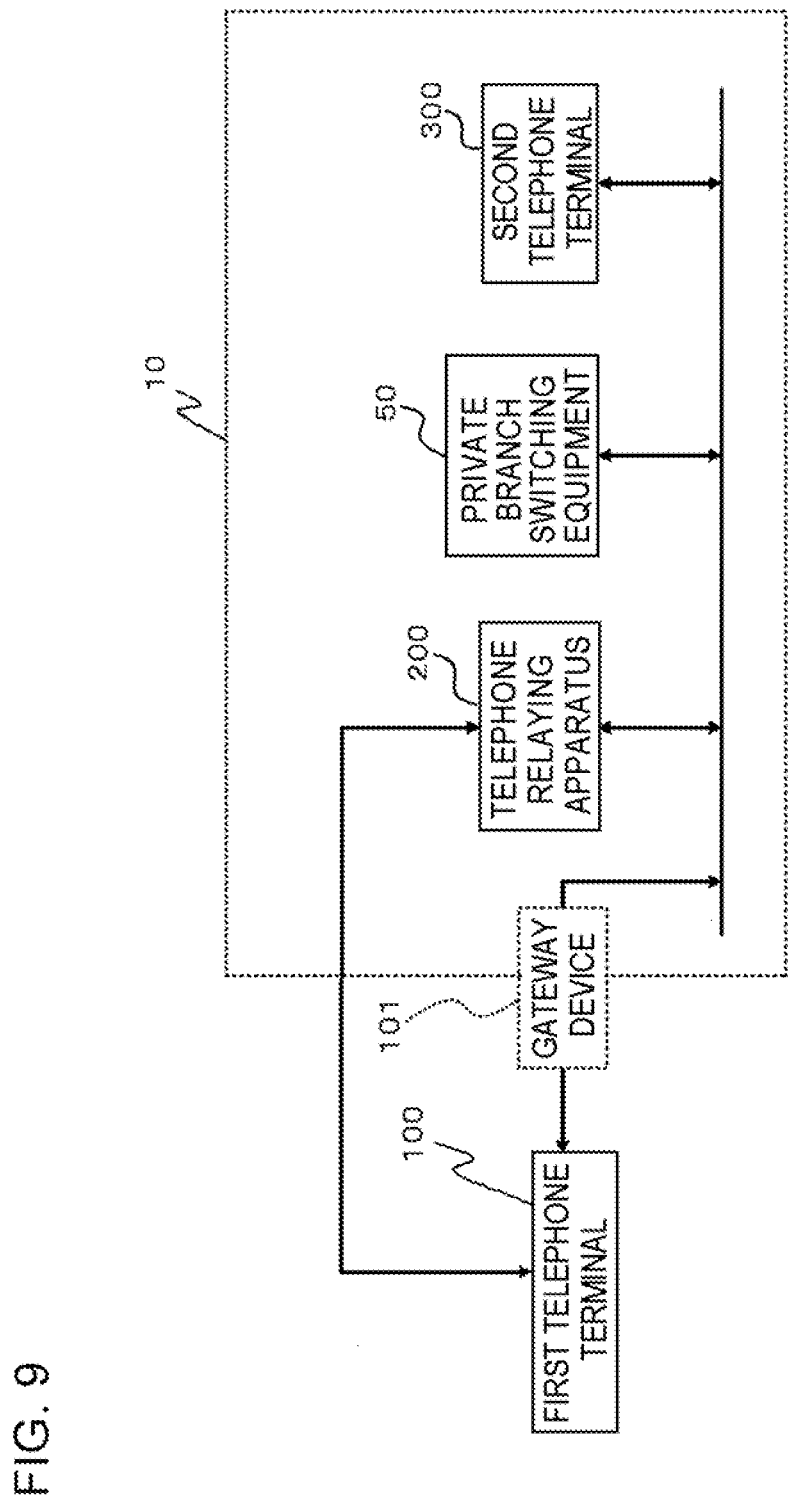
FIG. 9 is a diagram illustrating a usage environment of a telephone relaying apparatus according to a fourth embodiment.

FIG. 9 shows a diagram illustrating a usage environment of a telephone relaying apparatus 200 according to a fourth embodiment, and corresponds to FIG. 1 in regard to the first embodiment. This drawing is the same as one of the first to third embodiments except that the telephone relaying apparatus 200 receives a connection request from the first telephone terminal 100 through a data communication network instead of the request transmission device 110. In addition, it is not necessary for the telephone communication network and the data communication network to be physically different communication networks, and these may be logically different communication networks.

In the embodiment, it is also possible to obtain the same effect as that of any one of the first to third embodiments.

Figure 10:
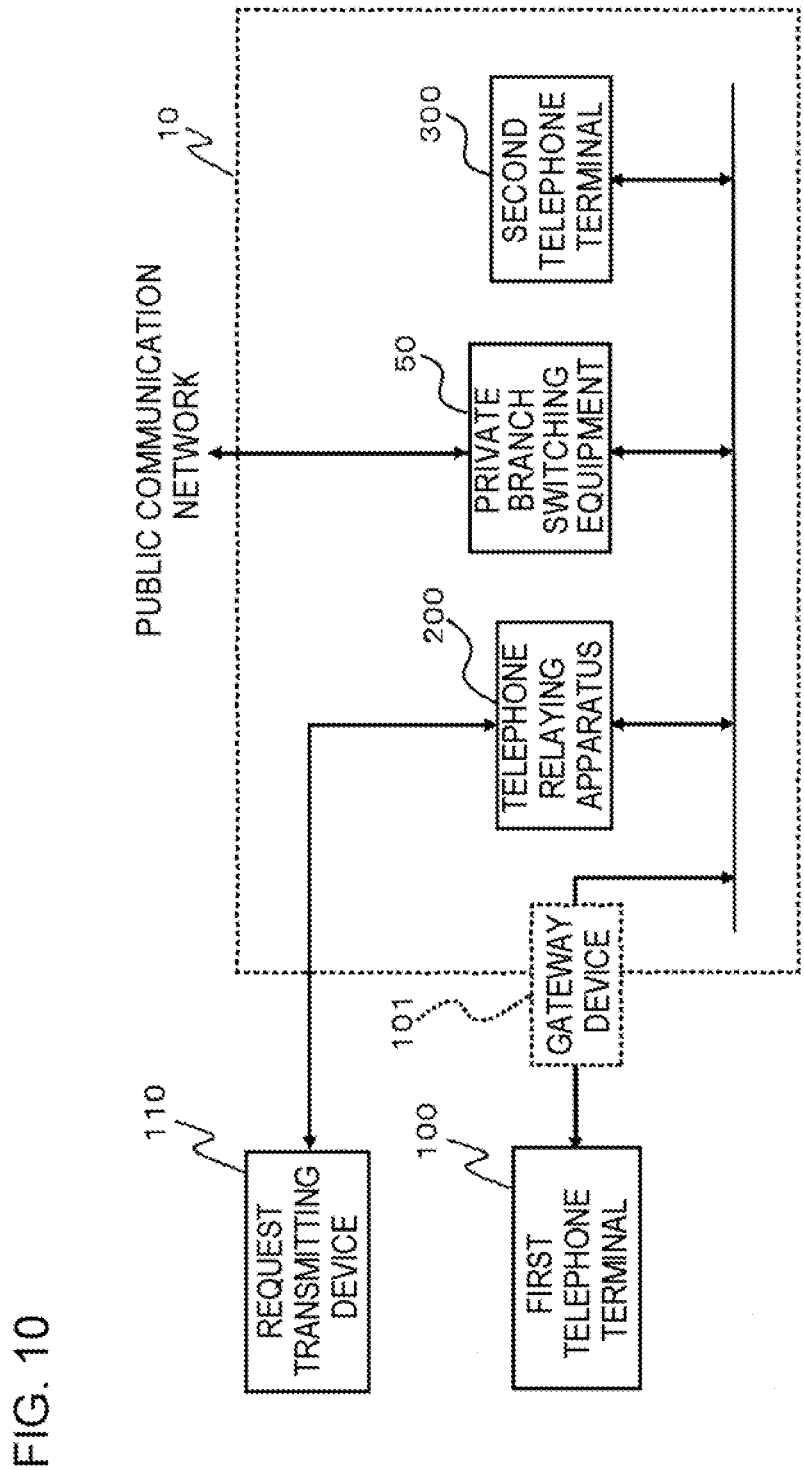
FIG. 10 is a diagram illustrating a usage environment of a telephone relaying apparatus according to a fifth embodiment.

FIG. 10 shows a diagram illustrating a usage environment of a telephone relaying apparatus 200 according to a fifth embodiment, and corresponds to FIG. 1 in regard to the first embodiment. This drawing is the same as one of the first to third embodiments except that the communication network 10 is an extension communication network, and the private branch switching equipment 50 is connected to a public communication network.

FIG. 11 shows a diagram illustrating a data configuration of a telephone number storage unit 210 in a table format. In this embodiment, the published number, an external number as a first real number, an extension number as a second real number are stored in correlation with each other for each telephone terminal.

The published number is used when it is made to be displayed on the first telephone terminal 100 and the second telephone terminal 300 as a telephone number of a counterpart (step S100 and step S120 in FIGS. 4 and 6) in regard to a first call and a second call. That is, in this embodiment, even when either the external number or the extension number is used, any one of the external number and the extension number of a telephone number of a counterpart is not displayed on the first telephone terminal 100 and the second telephone terminal 200, and the published number is displayed instead of these numbers.

According to this embodiment, it is possible to obtain the same effect as that of one of the first to third embodiments. In addition, even when a called number included in a call request is an external number of the second telephone terminal 300, the telephone relaying apparatus 200 may connect to the first telephone terminal 100 and the second telephone terminal 300 without through a public communication network. Therefore, it is possible to reduce a traffic in the public communication network.

Hereinbefore, the embodiments of the invention are described with reference to the accompanying drawings, but the invention is not limited to these embodiments, and various configuration may be adopted.

The present patent application claims priority from Japanese Patent Application No. 2009-121374 filed on May 19, 2009, the disclosure of which is incorporated herein by reference.

The invention claimed is:

1. A telephone relaying apparatus that is used in a communication network provided with switching equipment, comprising:
a telephone number storage unit that, for each of a plurality of telephone terminals that is connected to the communication network, stores a real number that is a telephone number used in the case of directly connecting to the telephone terminal and a published number that is a number published for a third party as a telephone number of the telephone terminal in correlation with each other;
a connection request receiving unit that receives a request for connection to a second telephone terminal from a first telephone terminal from a computer terminal which a user of the first telephone terminal operates through a data communication, the connection request including a telephone number of the first telephone terminal connected to the communication network and a telephone number of the second terminal;

a first connection processing unit that respectively reads out the published number of the second telephone terminal and the real number of the first telephone terminal from the telephone number storage unit based on the telephone number of the second telephone terminal and the telephone number of the first telephone terminal which are included in the connection request, and makes a first call to the first telephone terminal, in which the published number of the second telephone terminal is set as a calling number and in which the real number of the first telephone terminal is set as a called number; and a second connection processing unit that respectively reads out the published number of the first telephone number and the real number of the second telephone terminal from the telephone number storage unit based on the telephone number of the first telephone terminal and the telephone number of the second telephone number which are included in the connection request, and makes a second call to the second telephone terminal, in which the published number of the first telephone terminal is set as a calling number and in which the real number of the second telephone terminal is set as a called number.

2. The telephone relaying apparatus according to claim 1, wherein in a case where the telephone number, which is included in the connection request, of the second telephone terminal is not stored in the telephone number storage unit, the second connection processing unit makes a third call to the switching equipment, in which the published number of the first telephone terminal is set as a calling number and the telephone number of the second telephone terminal is set as a called number.

3. The telephone relaying apparatus according to claim 1, wherein the communication network is an extension communication network, and the real number is an external number or an extension number.

4. A telephone relaying method, in which a telephone relaying apparatus is provided to a communication network provided with switching equipment, and the telephone relaying apparatus is provided with a telephone number storage unit that, for each of a plurality of telephone terminals that is connected to the communication network, stores a real number that is a telephone number used in the case of directly connecting to the telephone terminal and a published number that is a number published for a third party as a telephone number of the telephone terminal in correlation with each other, the method comprising:

allowing the telephone relaying apparatus to receive a request for connection to a second telephone terminal from a first telephone terminal from a computer terminal which a user of the first telephone terminal operates through a data communication, the connection request including a telephone number of the first telephone terminal connected to the communication network and a telephone number of the second terminal, to respectively read out the published number of the second telephone terminal and the real number of the first telephone terminal from the telephone number storage unit based on the telephone number of the second telephone terminal and the telephone number of the first telephone terminal which are included in the connection request and to make a first call to the first telephone terminal, in which the published number of the second telephone terminal is set as a calling number and in which the real number of the first telephone terminal is set as a called number, and to respectively read out the published number of the first telephone number and the real number of the second telephone terminal from the telephone number storage unit based on the telephone number of the first telephone terminal and the telephone number of the second telephone number which are included in the connection request, and make a second call to the second telephone terminal, in which the published number of the first telephone terminal is set as a calling number and in which the real number of the second telephone terminal is set as a called number.

5. A non-transitory computer readable storage media that stores a program that allows a computer to serve as a telephone relaying apparatus, in which the telephone relaying apparatus is provided to a communication network provided with switching equipment, the program allowing the computer to execute:

a function of connecting to a telephone number storage unit that, for each of a plurality of telephone terminals that is connected to the communication network, stores a real number that is a telephone number used in the case of directly connecting to the telephone terminal and a published number that is a number published for a third party as a telephone number of the telephone terminal in correlation with each other;

a function of receiving a request for connection to a second telephone terminal from a first telephone terminal from a computer terminal which a user of the first telephone terminal operates through a data communication, the connection request including a telephone number of the first telephone terminal connected to the communication network and a telephone number of the second terminal;

a function of respectively reading out the published number of the second telephone terminal and the real number of the first telephone terminal from the telephone number storage unit based on the telephone number of the second telephone terminal and the telephone number of the first telephone terminal which are included in the connection request, and of making a first call to the first telephone terminal, in which the published number of the second telephone terminal is set as a calling number and in which the real number of the first telephone terminal is set as a called number; and a function of respectively reading out the published number of the first telephone number and the real number of the second telephone terminal from the telephone number storage unit based on the telephone number of the first telephone terminal and the telephone number of the second telephone number which are included in the connection request, and making a second call to the second telephone terminal, in which the published number of the first telephone terminal is set as a calling number and in which the real number of the second telephone terminal is set as a called number.

* * * * *